(12) United States Patent
Morris et al.

(10) Patent No.: US 7,562,410 B2
(45) Date of Patent: Jul. 21, 2009

(54) SYSTEM AND METHOD FOR MANAGING A COMPUTER NETWORK

(75) Inventors: Craig G. Morris, Redmond, WA (US); Mukunda S. Murthy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 11/082,183

(22) Filed: Mar. 15, 2005

(65) Prior Publication Data

US 2006/0212568 A1    Sep. 21, 2006

(51) Int. Cl.
*G06F 15/173* (2006.01)
(52) U.S. Cl. .................. 709/220; 714/38; 709/223; 709/224; 709/226; 717/168; 717/175; 717/177
(58) Field of Classification Search .............. 709/226; 379/112.05
See application file for complete search history.

(56) References Cited

U.S. PATENT DOCUMENTS

| | | | | |
|---|---|---|---|---|
| 5,261,044 A | * | 11/1993 | Dev et al. | 715/855 |
| 6,209,033 B1 | * | 3/2001 | Datta et al. | 709/224 |
| 6,958,979 B2 | * | 10/2005 | Bulick et al. | 370/254 |
| 7,185,077 B1 | * | 2/2007 | O'Toole et al. | 709/223 |
| 2001/0047409 A1 | * | 11/2001 | Datta et al. | 709/224 |
| 2004/0030768 A1 | * | 2/2004 | Krishnamoorthy et al. | 709/223 |
| 2004/0210653 A1 | * | 10/2004 | Kanoor et al. | 709/223 |

OTHER PUBLICATIONS

Lowe, Scott, Estimate infrastructure needs with the Active Directory Sizer, Mar. 5, 2003, p. 1-12.*
Using Tables in your Web Page, Dec. 2004, p. 1.*

* cited by examiner

*Primary Examiner*—James Trujillo
*Assistant Examiner*—Albert Phillips
(74) *Attorney, Agent, or Firm*—Workman Nydegger

(57) ABSTRACT

A system and method for managing a distribution network is provided. A management system obtains a network topology of physical locations and usage data for each identified location. The management system displays a set of possible distribution configurations for each location. The management system generates configuration recommendations based upon the specified distribution configuration.

11 Claims, 4 Drawing Sheets

| CONFIG. OPTIONS | CLIENT USAGE | PARENT USAGE | COMMENTS | SELECT |
|---|---|---|---|---|
| 1 | XX % | XX % | XXXXXXXXX XXXXXXX XXXXXX | ☐ |
| 2 | XX % | XX % |  | ☐ |
| 3 | XX % | XX % | XXXXXXXXX XXXXXXX XXXXXX | ☐ |
| 4 | XX % | XX % |  | ☐ |
| 5 | XX % | XX % | XXXXXXXXX XXXXXXX XXXXXX | ☐ |
| 6 |  |  |  | ☐ |

LOCATION ID  XXXXX
PARENT ID  XXXXX
LOCATION NAME  XXXXX
CLIENTS  XXXXX

*Fig. 4.*

SYSTEM AND METHOD FOR MANAGING A COMPUTER NETWORK

FIELD OF THE INVENTION

The present invention relates to computer software and communication networks, and in particular, to a system and method for providing software distribution capacity planning and hardware sizing in a distribution network.

BACKGROUND OF THE INVENTION

Computer networks can correspond to a number of computing devices connected via various communication links. In a typical larger scale network environment, a network may include a plurality of server and client computing devices at several geographic locations. As computer networks grow in size and complexity, there is a need for administrative tools that facilitate software distribution, asset management and/or software patch deployment. One such administrative tool is Microsoft Corporation's Systems Management Server ("SMS").

In administrative tools, such as SMS, computers (e.g., servers) are located throughout a computer network and are configured to have a specific software distribution/management role. Often times, the specific configuration of a server will depend on the network topology and/or the anticipated software distribution load of the network. For example, in SMS, a server can have one of many possible management/distribution roles, such as a central server, distribution point, secondary site, management point, reporting point, and the like. Configuring a server device incorrectly, such as by selecting an incorrect role can result in an inefficient utilization of the server computer within the SMS system or the creation of distribution bottlenecks depending on the error. Similarly, selecting inappropriate hardware resources for a configured server (such as the number of processors, speed of processors, memory, etc.) can also result in an inefficient utilization of computer resources or the creation of distribution bottlenecks. Accordingly, capacity planning and hardware sizing functionality can become necessary for proper implementation of administrative tools.

Traditional capacity planning/hardware sizing functionality relies on static models for a network topology and server computer configuration. For example, in tools where network topology models are pre-determined, the tool does not provide adequate planning flexibility for customized network topologies. Thus, network administrators may not be able to properly model the actual configuration of the network. Additionally, the fixed static model approach does not provide adequate flexibility in facilitating various "what if" scenarios to determine the impact of different configuration settings for the server computing components in the SMS system. Accordingly, system administrators cannot typical test the impact of different server role configurations and/or hardware settings to a network model.

Thus, there is a need for a system and method for managing a distribution network that provides dynamic capacity planning and hardware sizing capabilities.

SUMMARY OF THE INVENTION

A system and method for managing a distribution network is provided. A management system obtains a network topology of physical locations and usage data for each identified location. The management system displays a set of possible distribution configurations for each location. The management system generates configuration recommendations based upon the specified distribution configuration.

In accordance with an aspect of the present invention, a method for managing a distribution network is provided. A management system obtains network environment data corresponding to a distribution network having at least one location. The management system obtains usage data corresponding to the network environment data. The management system then generates distribution configurations for locations in the distribution network corresponding to the network environment and usage data. The management system displays distribution configurations for the locations.

In accordance with another aspect of the present invention, a method for managing a distribution network. A management system obtains network environment data corresponding to a distribution network having at least one location. The management system obtains usage data corresponding to the network environment data. The management system generates at least one distribution configuration for the at least one location in the distribution network corresponding to the network environment and usage data. The management system then displays the at least one distribution configuration.

In accordance with a further aspect of the present invention, a method for distribution network planning is provided. A management system obtains a site topology for a distribution network having a set of identifiable locations. The management system displays a set of distribution scenarios for each identified location in the distribution network. The management system then obtains a selection of a distribution scenario for an identified location in the distribution network. The management system generates a configuration recommendation for the selected distribution scenario for the identified location.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrative of a screen display for selecting a distribution configuration for a location in a distribution network in accordance with an aspect of the present invention.

DETAILED DESCRIPTION OF THE PREFERRED EMBODIMENT

Generally described, the present invention relates to a system and method for managing a distribution network including a number of distribution locations. More specifically, the present invention relates to a system and method for providing capacity planning and hardware sizing functionality for managing a distribution network. Although the present invention will be described with regard to an illustrative distribution network topology, illustrative distribution network configuration information and illustrative screen displays, the disclosed embodiments should not be construed as limiting.

Figure 1:
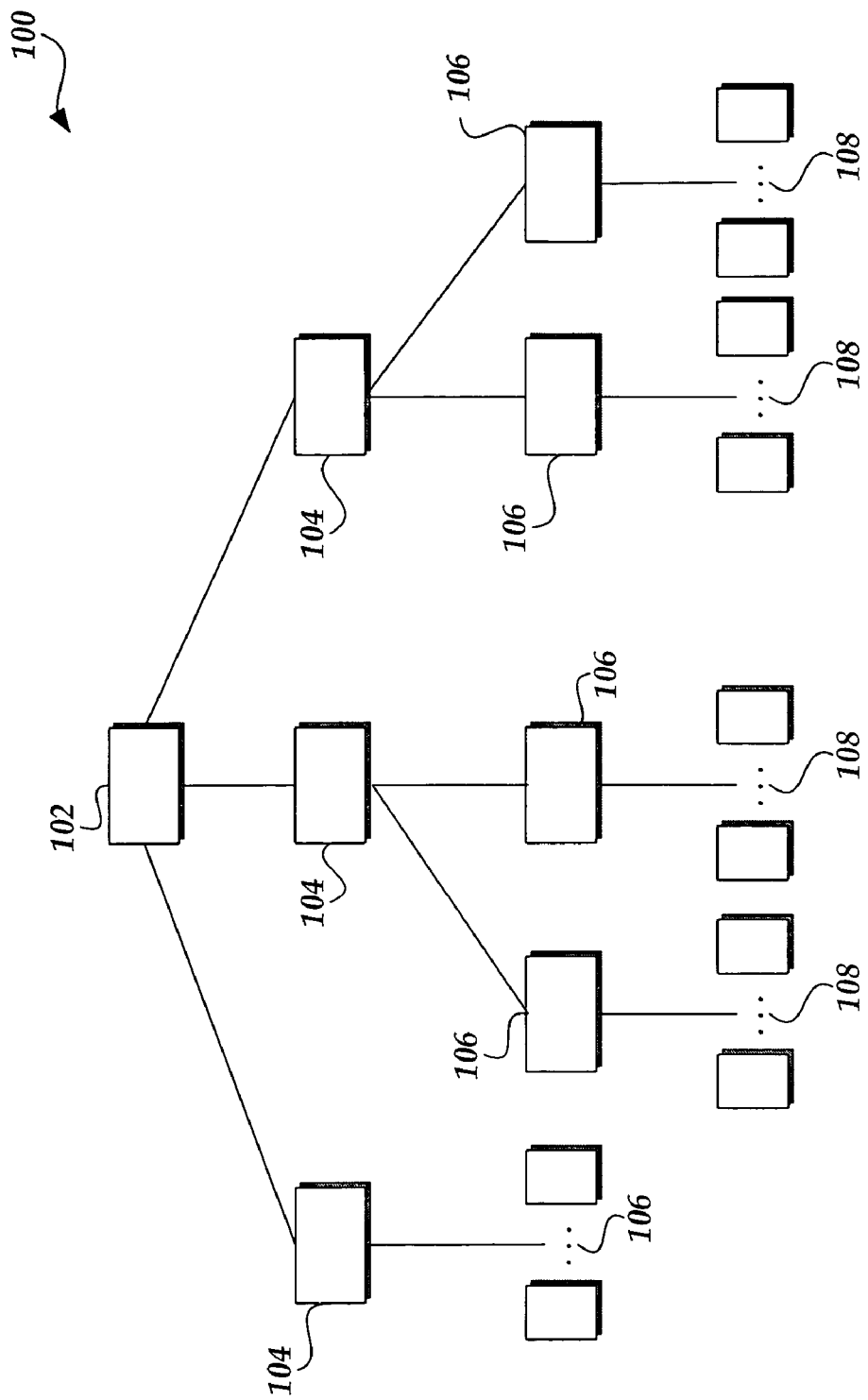
FIG. 1 is a block diagram of multi-tiered software distribution network topology including a central locations, a number of intermediary locations and a number of edge locations in accordance with an aspect of the present invention.

With reference to FIG. 1, a block diagram of multi-tiered software distribution network topology 100 will be described. The software distribution network topology 100 includes a plurality of manageable units that can be modeled and configured. In an illustrative embodiment of the present invention, a manageable unit can correspond to a physical location with a software distribution network. Alternatively, a manageable unit can correspond to a set of client computers that can be modeled and configured. One skilled in the relevant art will appreciate that all the manageable units in the software distribution network topology 100 are in communication with any number of client computing devices and provide software distribution/management functionality to the client computing devices.

As illustrated in FIG. 1, the software distribution network topology 100 corresponds to a hierarchy of logical tiers. The top tier in the software distribution network topology 100 includes a central location 102 that serves as the central site in the distribution network. A second tier includes a number of intermediary locations 104 that are in direct communication with the central location 102. By way of example, the second tier can correspond to a grouping of computers by country. A third tier includes a number of intermediary locations and an edge location 106 that are in communication with one of the second tier locations 104. With reference to the previous example, the third tier can correspond to regional locations for each country. For purposes of the present invention, an edge location corresponds to the furthest location from the central location on a particular branch of the distribution network. Finally, a fourth tier of the software distribution network topology 100 includes edge locations 108 for the remaining branches of the distribution network.

Figure 2:
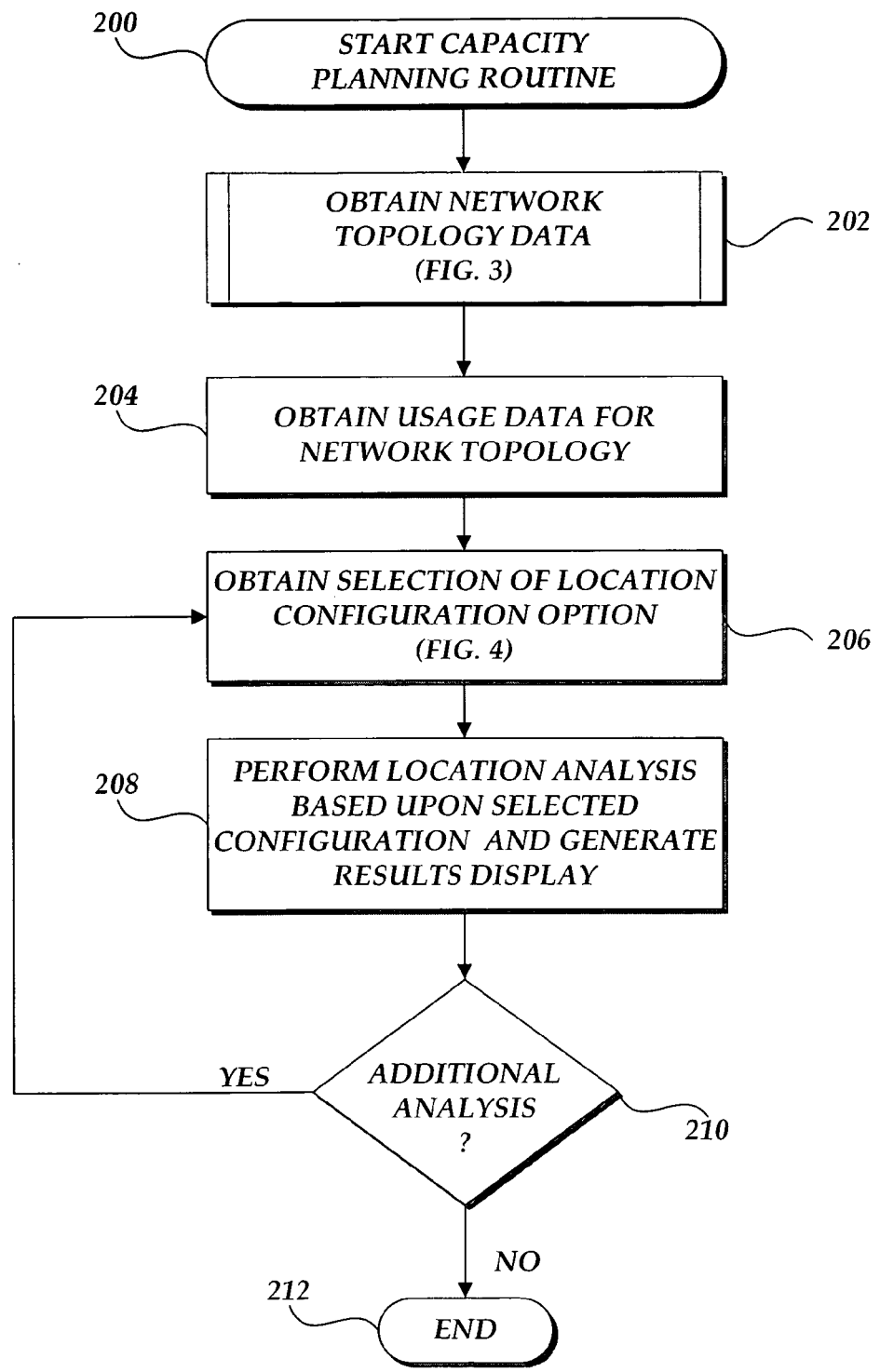
FIG. 2 is a flow diagram of a capacity planning and hardware sizing routine in accordance with the present invention.

With reference now to FIG. 2, a capacity planning and hardware sizing routine 200 for a distribution network will be described. In accordance with an illustrative embodiment of the present invention, the capacity planning and hardware sizing routine 200 may be implemented by a distribution network administrator to select proper configuration and hardware resources for any of the locations on the distribution network. The computing device executing the capacity planning and hardware sizing routine 200 will be generally referred to as the "management system."

Figure 3:
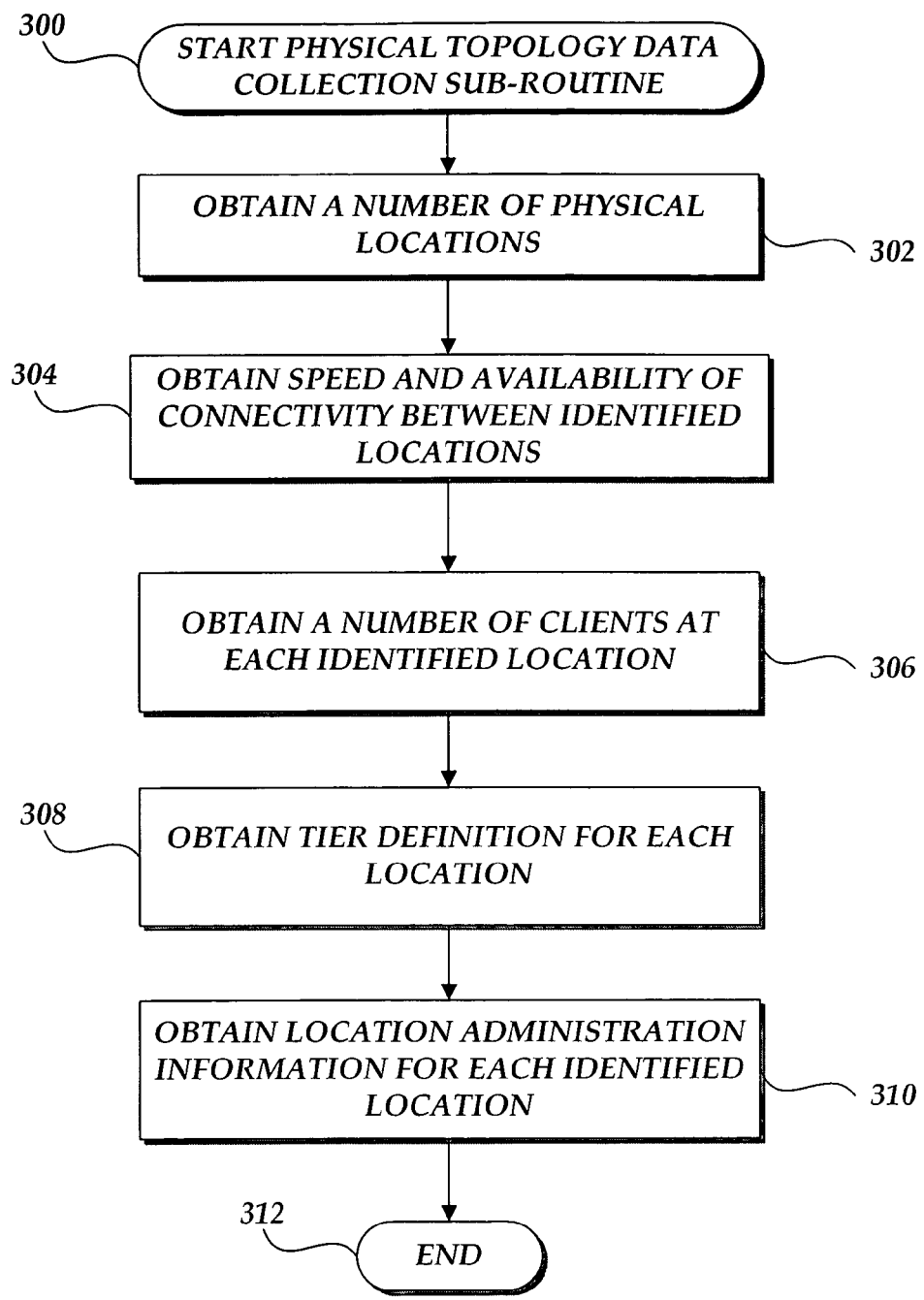
FIG. 3 is a flow diagram of a network topology generation sub-routine in accordance with the present invention.

With reference to FIG. 2, at block 202, the management system obtains distribution network topology data. FIG. 3 is a flow diagram of a network topology generation sub-routine 300 implemented by the management system in accordance with an aspect of the present invention. In an illustrative embodiment of the present invention, the collection of network topology information is an interactive process with a system administrator. At block 302, the management system obtains the number of manageable units (e.g., physical locations) that are included in the distribution network. At block 304, the management system obtains the speed of the communication networks between each of the identified locations in the distribution network. Additionally, the management system obtains the availability of the network connections for distribution/management data traffic.

At block 306, the management system obtains the number of client computing devices that will be in communication with each identified location. At block 308, the management system obtains a distribution network tier designation for each identified location. Finally, at block 310, the management system obtains location administrative information for each identified location. For example, the management system can obtain information whether a location system administrator will be present at the location. At block 312, the sub-routine 300 returns.

In an illustrative embodiment of the present invention, sub-routine 300 may be embodied as a recursive process for facilitating the manual entry of the network topology. For example, the management system may generate a screen display that prompts a system administrator to complete the necessary information for each location. As additional children locations are identified, the management system would collect information about each child location via additional screen displays. Additionally, in an illustrative embodiment of the present invention, the management system may pre-populate one or more fields of screen display based upon a designation of a distribution tier. The resulting network topology configuration can be exported as a spreadsheet that can manually reviewed and adjusted.

Returning to FIG. 2, at block 204, the management system obtains usage data for the specified distribution network topology. In an illustrative embodiment of the present invention, usage data can correspond to the size and frequency of hardware inventory and the size and frequency of software distribution packets that correspond to the distribution network. The management system can maintain a knowledge base of typical usage data for a distribution network. For example, the management system may estimate network traffic depending on an estimated size of software distribution packages and the frequency of their delivery. The management system may also estimate usage based on the potential for roaming client computing systems between network locations.

At block 206, the management system obtains location configuration options for each identified location in the distribution network. In an illustrative embodiment of the present invention, each location with the distribution network may be configured in one of a variety of distribution roles with the distribution network. The selection of the most proper role corresponds to an analysis of the physical topology of the distribution network and the data usage within the topology. Accordingly, in some scenarios, more than one distribution role may be applicable for a particular location. For example, a parent site may be configured as a distribution point location with all its children location as secondary site locations. However, if the number of children locations is too large and/or depending on the number of client computers connected to each location, one or more of the children locations may be configured a distribution point location to mitigate network bottlenecks.

In an illustrative embodiment of the present invention, the management system generates a screen display that includes a set of distribution configurations for a specified location. FIG. 4 is a block diagram illustrative of a screen display 400 for specifying a distribution configuration for a location in accordance with an aspect of the present invention. The screen display 400 includes a number of fields for identifying a particular location identification 402, a parent location identification 404, a location name 406 and the number of client computing devices connected to the location 408. The screen display 410 also includes a configuration selection display 410. The configuration display 410 includes a column 412 that identifies one or more potential distribution configurations for the identified location. The configuration display 410 can also include one or more columns that provide additional details regarding a particular selected distribution configuration. As illustrated in FIG. 4, the configuration display 410 includes columns 414, 416 that estimate the usage of available link bandwidth by any child locations to the selected location and by the parent to the selected location. The configuration display 410 can also include a comment column 418 that may be used to identify specific information about the location (e.g., local administrator not present) or about the selected distribution configuration (e.g., the network link with the parent is saturated). The configuration display 410 also includes selection column 420 that allows a system administrator to select a particular distribution configuration for modeling. In an illustrative embodiment of the present invention, the screen display 400 may prevent unavailable or poorly performing distribution configurations from being selected and/or displayed. The screen display 400 can also include one or more controls 422 for proceeding with the selection of a distribution configuration.

Returning to FIG. 2, at block 208, the management system obtains the selection of the configuration and performs a location analysis. In an illustrative embodiment of the present invention, the management system may maintain a knowledge base of hardware sizing recommendations based on specified distribution configuration. Alternatively, the management system may communicate with an external knowledge base, such as a Web service, that can provide hardware sizing recommendations. Upon obtaining the necessary information, the management system returns recommendations for implementing the selected distribution configuration for the specified location. The recommendation can include a specification of hardware resources include number of processors, an amount of memory, a number of disk arrays, a number of network interface cards and additionally hardware configuration information. Additionally, the management system may also return estimated performance data.

At decision block 210, a test is conducted to determine whether additional analysis is required. In an illustrative embodiment of the present invention, the selection of distribution configuration may be repeated to provide for various what if scenarios. For example, routine 200 may be utilized to model distribution network efficiency due to adjustment of location roles/resources. Additionally, routine 200 may be utilized to model potential effects of the addition of locations. If additional analysis is required, the routine 200 returns to block 206 for the selection of another distribution configuration (screen display 400, FIG. 4). Alternatively, routine 200 terminates at block 212.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for scenario analysis, capacity planning, and hardware sizing in an administrative tool system for software distribution, asset management and patch deployment, wherein the administrative tool system is distributed across a plurality of server computing devices at a plurality of physical locations in a software distribution network and wherein each of the plurality of server computing devices has a specific physical hardware configuration including memory, one or more processors, one or more disk arrays and one or more network interface devices, and wherein each of the plurality of server computing devices is configured to have a specific software distribution and management role within the administrative tool system, the method comprising:

an act of selecting a particular computing device to be a management system which will execute remaining acts of the method, an act of the management system obtaining a software distribution network topology model for the software distribution network, the software distribution network topology model comprising network environment data and software distribution usage data, the act of the management system obtaining the software distribution network topology model further comprising:

an act of the management system collecting the network environment data through an interactive process with a system administrator, the network environment data comprising availability and speed of connectivity between the plurality of locations in the software distribution network, and number of client computing systems at each of the plurality of locations; and an act of the management system dynamically generating the software distribution usage data from at least the following: size and frequency of hardware inventory, size and frequency of software distribution packets that correspond to the software distribution network, estimated network traffic, estimated size of software distribution packages and frequency of their delivery, and potential for roaming client computing systems;

an act of the management system dynamically generating, through analysis of the network environment data and software distribution usage data, a plurality of possible distribution roles for at least one server of the plurality of servers in the software distribution network;

an act of the management system displaying, for the at least one server, the plurality of possible distribution roles and information about each of the plurality of possible distribution roles;

an act of the management system obtaining from the system administrator a selection of a distribution role from the displayed plurality of possible distribution roles;

an act of the management system performing a location analysis using the selected distribution role; and an act of the management system generating a hardware configuration recommendation for the selected distribution role.

2. The method as recited in claim 1, wherein the act of displaying the plurality of possible distribution roles and information about each of the plurality of possible distribution roles includes displaying estimated bandwidth utilization for the at least one location in the software distribution network, and wherein displaying estimated bandwidth utilization comprises displaying distinct estimated bandwidth percentages for client usage and parent usage such that client bandwidth usage and parent bandwidth usage are distinctly calculated and displayed.

3. The method as recited in claim 1 further comprising:

an act of obtaining a second user selection of a distribution role from the displayed plurality of possible distribution roles; and an act of performing a second location analysis using the second user selected distribution role and generating a second hardware configuration recommendation for the second user selected distribution role.

4. The method as recited in claim 1, wherein each of the plurality of locations in the software distribution network corresponds to a tier in the distribution network, the method further comprising automatically populating the network environment data and the software distribution usage data for each of the plurality of locations in the software distribution network according to a tier designation for the location.

5. The method as recited in claim 1, wherein the network environment data further comprises an identification of one or more of the plurality of locations in the software distribution network, a tier classification for each identified location, communication bandwidth information for each identified location, and site administrative information for each identified location, the site administrative information comprising whether or not there is a system administrator available at the identified location.

6. The method as recited in claim 1, wherein the interactive process with the system administrator in order to collect the network environment data is a recursive process wherein data is recursively collected for individual locations until the network environment data has been gathered for each location in the plurality of locations.

7. The method as recited in claim 1, wherein one or more identified distribution roles that are determined to be poorly performing distribution roles are not user-selectable.

8. The method as recited in claim 1, wherein the hardware configuration recommendation is generated using data from a knowledge base maintained on the software distribution network and that is also available in an external knowledge base.

9. The method as recited in claim 1, wherein the displayed plurality of possible distribution roles and information are displayed in a user interface ("UI") display comprising a UI element displaying a location identification, a UI element displaying a parent identification, a UI element displaying a quantity of clients at the location, a UI element displaying a location name, and a UI table that includes a column including a plurality of fields that identify client bandwidth usage percentages corresponding to different possible distribution configurations, a column including a plurality of fields that identify parent bandwidth usage percentages corresponding to different possible distribution configurations, a column including a plurality of fields that identify comments corresponding to different possible distribution configurations, and a column having fields that include selection options for selecting one or more of the displayed plurality of possible distribution roles.

10. The method as recited in claim 1, wherein the specific software distribution and management role of each of the plurality of server computing devices in the software distribution network is selected from a set of software distribution and management roles comprising a central location role, a distribution point role, a secondary site role, a management point role, and a reporting point role; and wherein, in the act of the management system dynamically generating a plurality of possible distribution roles for the at least one server of the plurality of servers in the software distribution network, the plurality of possible distribution roles is selected from the set of software distribution and management roles comprising a central location role, a distribution point role, a secondary site role, a management point role, and a reporting point role.

11. A system comprising a plurality of computer servers at a plurality of locations in a software distribution network, wherein each of the plurality of servers has a specific physical hardware configuration including memory, one or more processors, one or more disk arrays and one or more network interface devices, and wherein the plurality of servers implement an administrative tool system for software distribution, asset management and patch deployment, and wherein each of the plurality of servers in the software distribution network is configured to have a specific software distribution and management role within the administrative tool system, selected from a set of software distribution and management roles comprising a central location role, a distribution point role, a secondary site role, a management point role, and a reporting point role, and wherein a computing device connected to the software distribution network is selected to be a management system which performs the following:

obtaining a software distribution network topology model for the software distribution network, the software distribution network topology model comprising network environment data and software distribution usage data, the act of obtaining the software distribution network topology model further comprising:

collecting the network environment data through an interactive process with a system administrator, the network environment data comprising availability and speed of connectivity between the plurality of locations in the software distribution network, and number of client computing systems at each of the plurality of locations; and dynamically generating the software distribution usage data from at least the following: size and frequency of hardware inventory, size and frequency of software distribution packets that correspond to the software distribution network, estimated network traffic, estimated size of software distribution packages and frequency of their delivery, and potential for roaming client computing systems;

dynamically generating, through analysis of the network environment data and software distribution usage data, a plurality of possible distribution roles for at least one server of the plurality of servers, wherein the plurality of possible distribution roles are selected from the set of software distribution and management roles;

displaying, for the at least one server, the plurality of possible distribution roles and information about each of the plurality of possible distribution roles;

obtaining from the system administrator a selection of a distribution role from the displayed plurality of possible distribution roles;

performing a location analysis using the selected distribution role; and generating a hardware configuration recommendation for the selected distribution role.

* * * * *